United States Patent
Miura

(10) Patent No.: US 7,433,705 B2
(45) Date of Patent: Oct. 7, 2008

(54) INFORMATION TERMINAL AND RECORDING MEDIUM FOR RECORDING PROGRAM OF A COMPUTER TO OPERATE AS THE INFORMATION TERMINAL

(75) Inventor: Nariaki Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 430 days.

(21) Appl. No.: 11/328,802

(22) Filed: Jan. 10, 2006

(65) Prior Publication Data
US 2006/0171657 A1    Aug. 3, 2006

(30) Foreign Application Priority Data
Jan. 31, 2005    (JP)    ............... 2005-023560

(51) Int. Cl.
*H04M 1/00*    (2006.01)
(52) U.S. Cl. ............. 455/550.1; 455/418; 455/566; 370/328; 707/10
(58) Field of Classification Search ............. 455/550.1, 455/418, 566; 370/328; 707/10
See application file for complete search history.

(56) References Cited
U.S. PATENT DOCUMENTS

| | | | |
|---|---|---|---|
| 5,848,356 A | 12/1998 | Jambhekar et al. | |
| 5,923,327 A | 7/1999 | Smith et al. | |
| 5,943,055 A | 8/1999 | Sylvan | |
| 5,978,595 A * | 11/1999 | Tanaka et al. | 710/57 |
| 6,233,578 B1 * | 5/2001 | Machihara et al. | 707/10 |
| 7,081,975 B2 * | 7/2006 | Yoda et al. | 358/474 |
| 2002/0019225 A1 * | 2/2002 | Miyashita | 455/412 |
| 2002/0022478 A1 * | 2/2002 | Iwao | 455/419 |
| 2003/0013483 A1 | 1/2003 | Ausems et al. | |
| 2003/0120956 A1 * | 6/2003 | Chiu et al. | 713/202 |
| 2004/0030935 A1 * | 2/2004 | Kai | 713/202 |
| 2005/0099946 A1 * | 5/2005 | Ito et al. | 370/230 |
| 2005/0136949 A1 * | 6/2005 | Barnes, Jr. | 455/461 |
| 2005/0245244 A1 * | 11/2005 | Estevez et al. | 455/415 |

FOREIGN PATENT DOCUMENTS

| | | |
|---|---|---|
| CN | 1076942 C | 12/2001 |
| JP | 2004-274346 | 9/2004 |

* cited by examiner

*Primary Examiner*—Danh C Le
(74) *Attorney, Agent, or Firm*—Scully, Scott, Murphy & Presser, P.C.

(57) ABSTRACT

Disclosed is an information terminal having a plurality of functions. The terminal includes: a function name storage section for storing at least one function name with respect to each of the plurality of functions; a user data storage section for storing user data; an operating section for receiving a retrieving word; a retrieval section for retrieving a function name and user data corresponding to a retrieving word from the function name storage section and the user data storage section; and a display control unit for displaying the function name and the user data outputted from the retrieval section collectively on a display screen.

12 Claims, 4 Drawing Sheets

INFORMATION TERMINAL AND RECORDING MEDIUM FOR RECORDING PROGRAM OF A COMPUTER TO OPERATE AS THE INFORMATION TERMINAL

BACKGROUND OF THE INVENTION

1. Field of the Invention

The present invention relates to an information terminal such as a cellular phone, in particular to a function selecting technology for the information terminal.

2. Description of the Related Art

When a user wants to execute a desired function of a cellular phone, the user has to select a function on a display screen, and then start the selected function. In these days, since various functions are provided to the cellular phone, many menus are structured hierarchically in multi-steps. The user has to follow the multi-step hierarchy of menu and select a desired function. Since each function is associated with a menu number, the user may input a menu number directly to select the function quickly. However, unless the user memorizes menu numbers, the user has to carry out a complicated selecting operation.

As a technology for solving the above problems, Japanese Patent Application Laid-Open No. 2004-274346 (Document 1) discloses a cellular phone in which predetermined keywords are associated with the respective functions and stored therein. When a user inputs a keyword to the cellular phone, the cellular phone displays a function name corresponding to the inputted keyword on a display screen. Also, in this cellular phone, the user is permitted to update a retrieval table for defining the association between the keywords and the functions.

In the cellular phone set forth in the document 1, the user has to carry out different operations with respect to the function and the user data respectively. In other words, in addition to the retrieval operation for the function name, the user carries out the retrieval operation for the user data such as phone number, mail address and Internet address. As described above, the cellular phone is on the way of straight line toward multi-functioning. As a result, it is getting more difficult for user to appropriately determine how he/she can obtain desired information; i.e., whether he/she should retrieve using the user data or the function name. That is, in the case where the user is not exactly aware of the information to be retrieved, or he/she is not familiar with the operation of his/her cellular phone, the user may carry out the retrieval using the user data and the function name successively.

For example, it is assumed that, after retrieving a function name, the user intends to connect with an Internet address associated with the function. In this case, the user retrieves the function first. On a guide screen of the function, when the user finds that an Internet address, which is one of the user data, has to be inputted, the user has to retrieve the user data anew. It is inconvenient for the user to repeat such a duplicated operation.

SUMMERY OF THE INVENTION

A first exemplary feature of the invention provides an information terminal with an increased user-friendliness.

According to a first exemplary aspect of the invention provides an information terminal having a plurality of functions. The terminal includes: a function name storage section for storing at least one function name with respect to each of the plurality of functions; a user data storage section for storing user data; an operating section for receiving a retrieving word; a retrieval section for retrieving a function name and user data corresponding to a retrieving word from the function name storage section and the user data storage section; and a display control unit for displaying the function name and the user data outputted from the retrieval section collectively on a display screen.

When a user inputs a retrieving word through the operating section on the information terminal, the retrieval section in the information terminal retrieves the function name and the user data corresponding to the retrieving word from the function name storage section and the user data storage section. And the information terminal displays the retrieved function name and user data on the display screen collectively. In this way, the user can recognize and obtain the information about both of the function name and the user data corresponding to the retrieving word collectively by carrying out a single retrieval operation with respect to the retrieving word.

Accordingly, even when the user is not exactly aware of the information to be retrieved, or the user is not familiar with the operation of the information terminal such as a cellular phone, the user can recognize the information such as the function and the user data associated with the retrieving word by carrying out single retrieval operation. Owing to this, the user-friendliness of retrieval is largely increased.

Further, when the user retrieves a function name to access to the external using the user data associated with the function, the user do not have to retrieve the user data again. Also in this point, the user-friendliness is increased.

Other features and aspects of the present invention will be understood by the description of preferred embodiments.

DETAILED DESCRIPTION OF THE PREFERRED EMBODIMENTS

Figure 1:
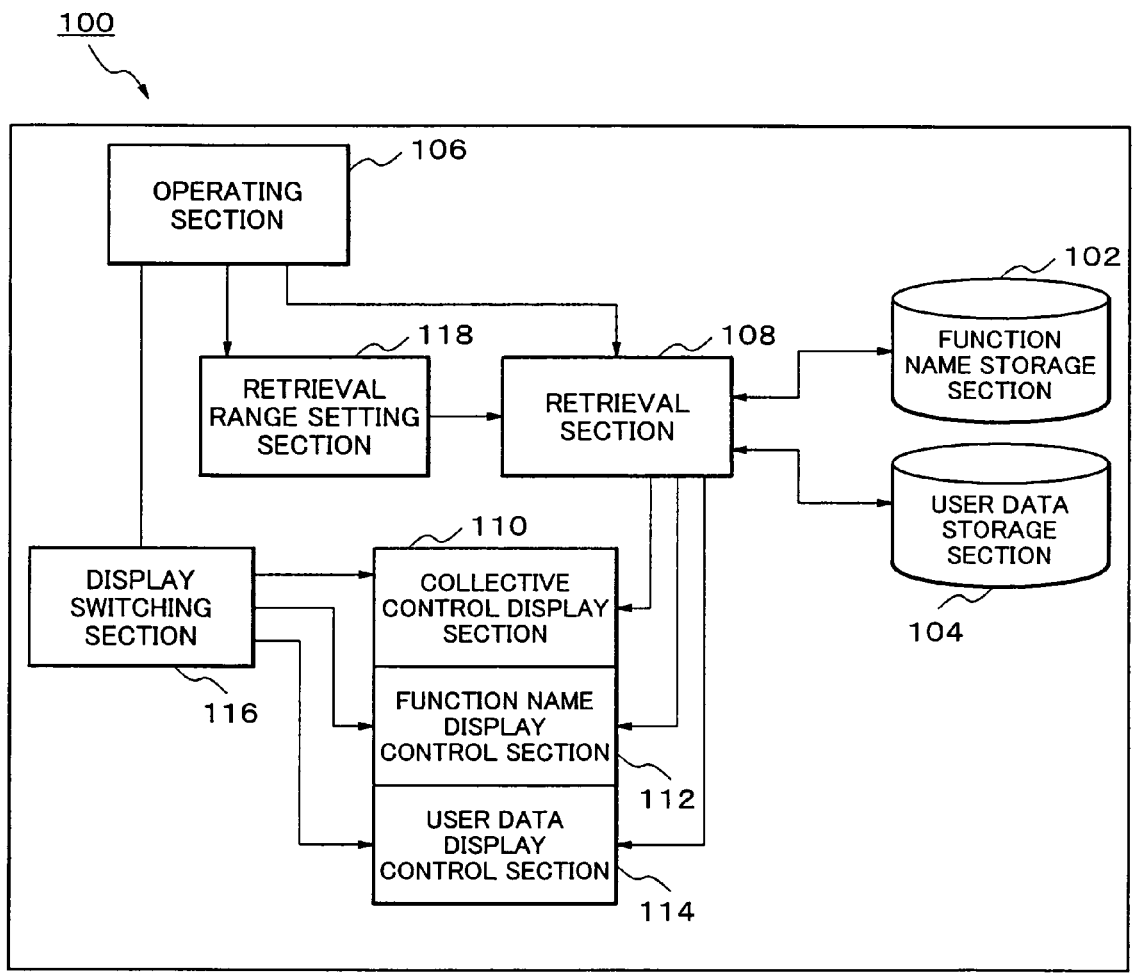
FIG. 1 is a functional bock diagram of a cellular phone according to an embodiment of the present invention.

Referring to the drawings, a preferred embodiment of an information terminal in accordance with the present invention will be described in detail. In the drawings, the identical elements will be given with the identical reference numerals, and redundant descriptions therefor will be omitted. In the following descriptions, the inventor will describe a preferred embodiment taking a cellular phone as an example. However, the present invention is not limited to the cellular phone. For example, the present invention is also applicable to information terminals such as personal handy phone system (PHS), personal digital assistants (PDA).

FIG. 1 is a functional bock diagram of a cellular phone according to an embodiment of the present invention. A cellular phone 100 has plural functions. As shown in FIG. 1, the cellular phone 100 includes: a function name storage section 102 for storing function names of the respective functions; a user data storage section 104 for storing the user data; an operating section 106 through which a retrieving word can be inputted; a retrieval section 108 which retrieves the function name and the user data associated with a retrieving word inputted through the operating section 106 from the function name storage section 102 and the user data storage section 104; a collective display section 110 for displaying the function name and the user data which are extracted by retrieving by the retrieval section 108 collectively on a display screen 202.

Further, the cellular, phone 100 includes a function name display section 112 which displays the function name out of the function name and the user data retrieved by the retrieval section 108 on the display screen 202, and a user data display section 114 which displays the user data out of the function name and the user data retrieved by the retrieval section 108 on the display screen 202. The sections 110, 112 and 114 constitute a display control unit.

Furthermore, the cellular phone 100 includes a display switching section 116 which selectively switches the state of display on the display screen 202 among the display through the collective display control section 110, the display through the function name display control section 112 and the display through the user data display control section 114 in accordance with the input from the operating section 106.

In addition, the cellular phone 100 includes a retrieval range setting section 118 for setting a range of the function name or the user data to be retrieved by the retrieval section 108 in accordance with the input from the operating section 106.

Figure 2:
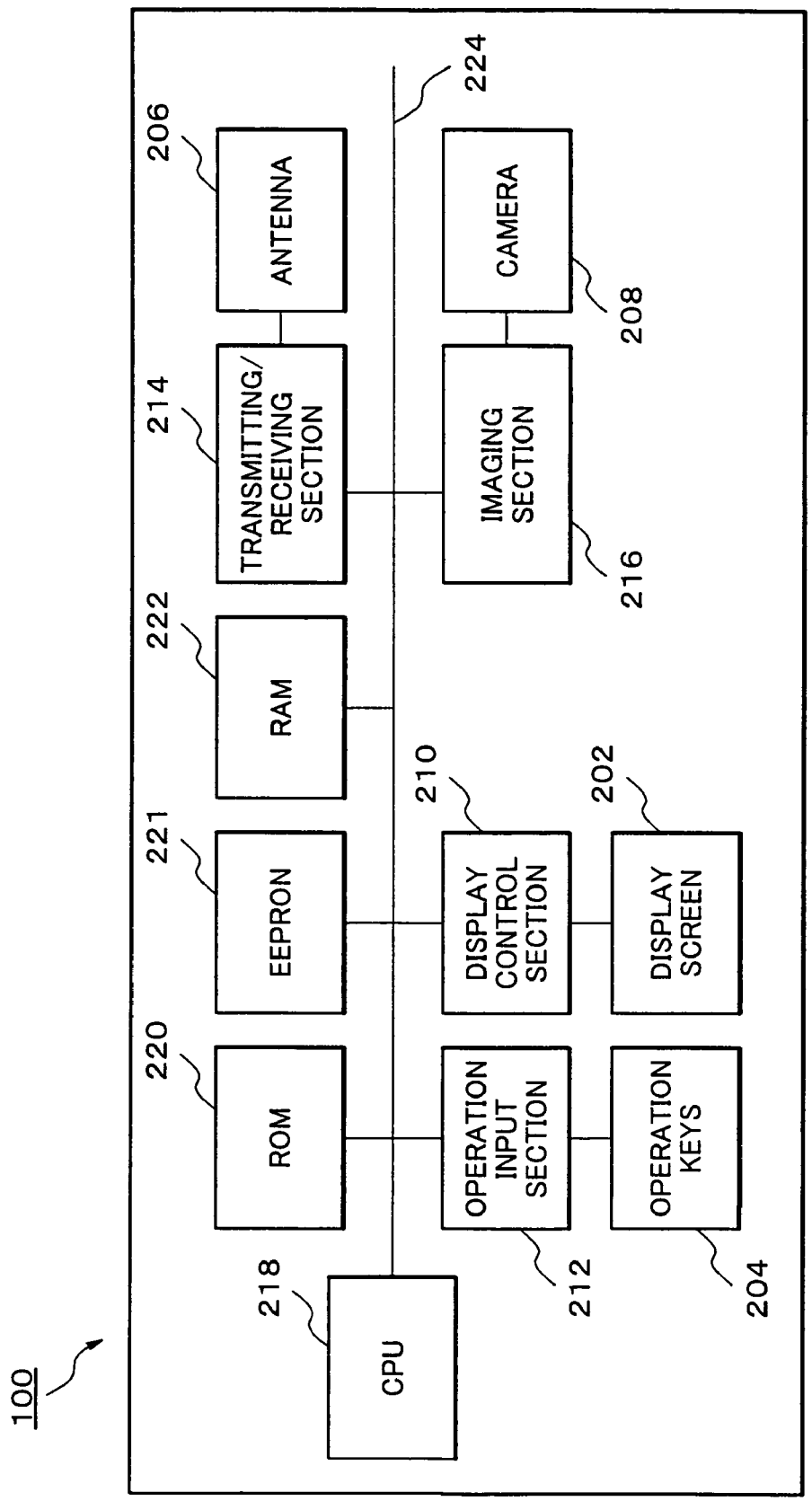
FIG. 2 is a bock diagram schematically showing the configuration of the cellular phone.

FIG. 2 is a block diagram schematically showing the configuration of the cellular phone.

The cellular phone 100 has a housing (not shown) as the body of the telephone set, and as shown in FIG. 2, a plurality of operation keys 204 and a display screen 202, which are exposed on the surface of the housing. That is, the cellular phone receives the input by a user through the operation keys 204, and displays information necessary for the user on the display screen 202. Also, on the housing, there are provided an antenna 206 for radio communication with the external and a camera 208 for taking optical image of the external. The display screen 202 is connected to a display control section 210; the respective operation keys 204 are connected to the operation input section 212; the antenna 206 is connected to a transmitting/receiving section 214; and the camera 208 is connected to an imaging section 216.

Further, the cellular phone 100 is provided with: a CPU 218; a ROM 220; an EEPROM 221; a RAM 222. These are connected, via a bus 224, to the display control section 210; the operation input section 212; the transmitting/receiving section 214; the imaging section 216.

The CPU 218 executes software stored in the ROM 220 and thereby controls the respective sections connected to the bus 224 as a whole. That is, the CPU 218 reads out each program from the ROM 220 and executes in accordance with a predetermined processing sequence and thereby retrieves the function name and the user data. Also, the ROM 220 stores function names of the respective functions.

The ROM 220 as the function name storage section 102 stores plural function names with respect to one function. For example, as for the function to obtain videos using the camera 208, the function name storage section 102 stores function names such as "video" and "movie". That is, the user can access to the function for obtaining videos by retrieving using any of the above function names.

The EEPROM 221 as the user data storage section, stores the respective user data. In this embodiment, the user data includes: a phone number data; a mail address data; an Internet address data; a music file name data; an image file name data; a video filename data; and an application file name data. Here, the user data may be the data which are registered in the ROM 220 by the user using operation keys 204 or the data registered therein by downloading from the external.

The phone number data are the data in which a registration name such as a personal name, a corporation name is associated with a phone number. The mail address data are the data in which a registration name such as a personal name, a corporation name is associated with an address. The Internet address data is the data in which a registration name such as a site name is associated with a URL (Uniform Resource Locator) including so-called a bookmark and the like. The music file data, the image file data, and the video file data are the data in which a registration name such as a title is associated with a file. The application file data are the data in which a registration name such as an application name is associated with a file. In this embodiment, the user data stored in the EEPROM 221 are sorted into the above data and registered.

In addition, the RAM 222 stores programs and data that are temporarily necessary for the CPU 218 to execute the respective programs.

The ROM 220 stores a retrieval program for retrieving the function name and the user data corresponding to the retrieving word inputted by the operation of the operation keys 204 from the ROM 220, and a program for displaying the function name and the user data extracted by the retrieval on the display screen 202 collectively. That is, the retrieval section 108 and the collective display section 110 are configured including the CPU 218, the ROM 220 and the RAM 222.

Figure 3:
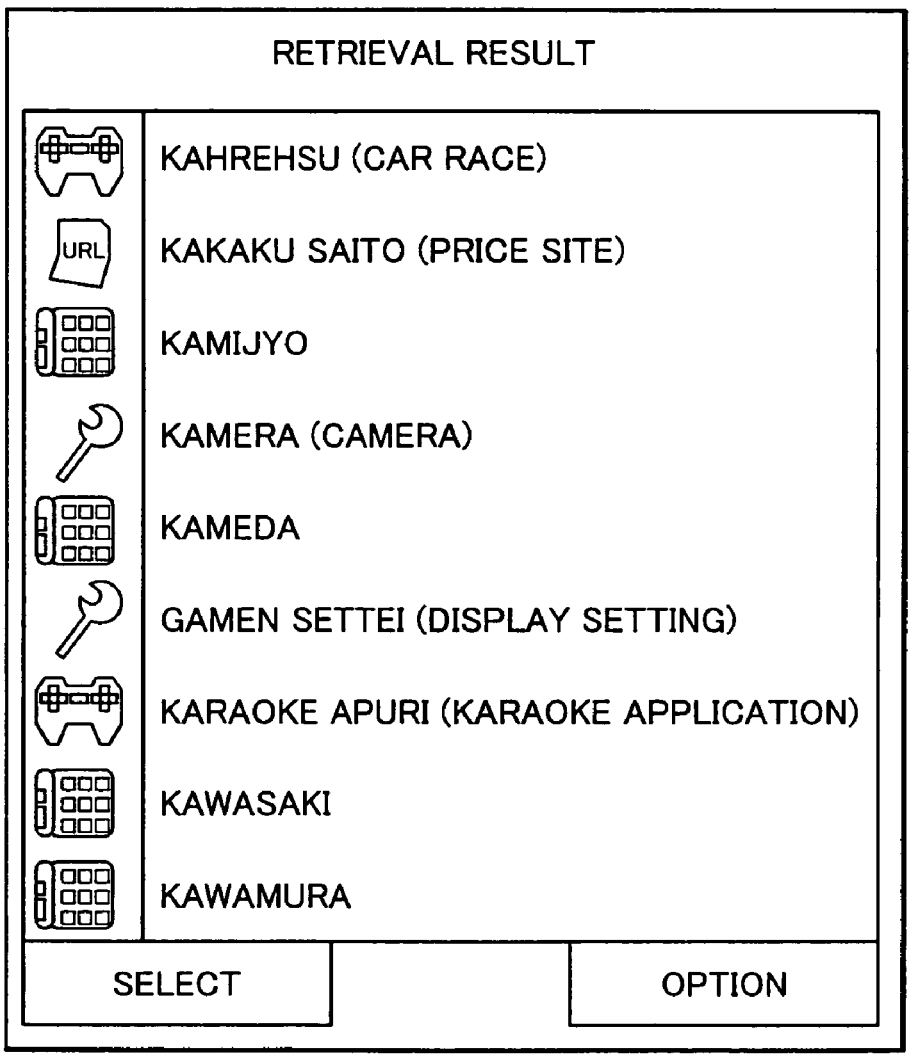
FIG. 3 shows an example of a display screen on which function names and user data extracted from a retrieval section are displayed collectively.

FIG. 3 is a plan view of a display screen on which the function name and the user data extracted by the retrieval section are displayed collectively.

As shown in FIG. 3, when the function name and the user data are displayed collectively, the user data are adapted so as to be displayed with the registration name. And icons to represent whether the displayed function name and user data are the function name or the user data are displayed. In this embodiment, the user data are allotted with different icons on the basis of the sort, and the icon is displayed along with the registration name. The function names are not sorted, but are allotted with the same icon.

In this embodiment, as shown in FIG. 3, the function name and the user data are displayed being aligned vertically. The icon is displayed on the left side in each line; and the registration name of the function name or the user data is displayed on the right side.

In addition, when there are too many amount of the retrieved function names and the retrieved user data to display on one display screen 202, the function name and the user data are allotted to plural pages, and another page can be seen by switching the display according to a predetermined operation by the user. In this case, since the function names and the user data are displayed collectively over plural pages, there may be a case where only the function names or the user data are displayed on a page.

Moreover, the ROM 220 stores a function name display program for displaying the function name out of the extracted function name and user data on the display screen 202, and a user data display program for displaying the user data out of the extracted function name and user data on the display screen 202. That is, the function name display section 112 and the user data display section 114 are configured including the CPU 218, the ROM 220 and the RAM 222.

Furthermore, the ROM 220 stores a display switching program for selectively switching the state of display using the display screen 202 among the display of the function name and the user data collectively, the display of the function name only and the display of the user data only in accordance with the input through the operation keys 204. That is, the display switching section 116 is configured including the CPU 218, the ROM 220 and the RAM 222. In this embodiment, the user data are adapted so as to be displayed being switched also on the basis of the sort.

Still furthermore, the ROM 220 stores a retrieval range setting program for setting the range of the function name and/or the user data to be retrieved by the retrieval program. That is, the retrieval range setting section 118 is configured including the CPU 218, the ROM 220 and the RAM 222. In this embodiment, the retrieval range setting section 118 is adapted so that the range of the user data to be retrieved is set on the basis of the sort.

Figure 4:
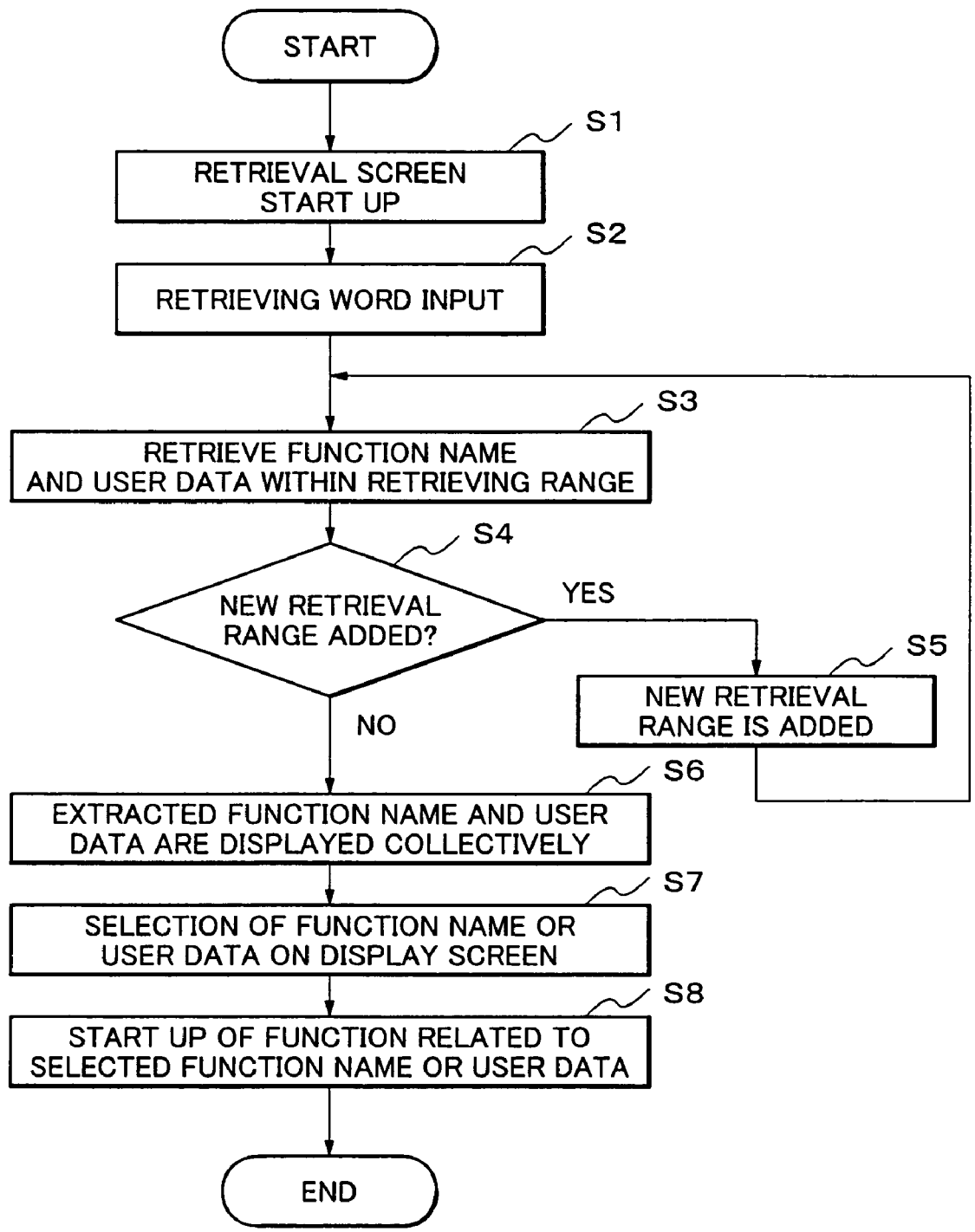
FIG. 4 is a flowchart illustrating the operation of the retrieval section.

The retrieving processing of the function name and the user data in the cellular phone 100 as configured above will be described with reference to the flowchart of FIG. 4. Incidentally, as the initial state, it is assumed that the retrieval range of the user data has been set to fall within the phone number data, the Internet address data, the music file data and the application file data.

When the user carries out an operation to access the retrieval mode, the cellular phone displays the retrieving window on the display screen 202 (step S1) and waits for a reception of a retrieving word from the operating section 106. When the user inputs a retrieving word (step S2), the retrieval section 106 retrieves the function name and the user data corresponding to the retrieving word within the range set by the retrieval range setting section 118 (step S3).

Then, the cellular phone displays an inquiry whether or not a new retrieval range is added on the display screen 202, and receives the input by the user (step S4). Here, when an operation to add a new retrieval range is made (step S4: Yes), the retrieval section adds a new retrieval range (step S5), and proceeds to step S3 and carries out the retrieval again. When no retrieval range is added (step S4: No), as shown in FIG. 3, the cellular phone displays the function name and the user data extracted by the retrieval section in an appropriate order (for example, in the order of the Japanese syllabary) on the display screen 202 collectively (step S6).

FIG. 3 shows the function and user data which are retrieved by using a retrieving word "ka (hiragana or katakana in Japanese)". As shown in FIG. 3, "camera (kamera in Japanese)" and "display setting (gamen settei in Japanese)" are displayed as the function names; "Kamijyo", "Kameda", "Kawasaki" and "Kawamura" are displayed as the phone number data; "price site (kakaku saito)" is displayed as the Internet address data; and "car race (kahrehsu)" and "karaoke apuri(karaoke application)" are displayed as the application file name data.

After that, when the user inputs an instruction to switch the display screen, the cellular phone switches the display on the display section from the collective display of the function name and the user data to the display of the function name only or the display of the user data only. Specifically, every time when the "→" key in the operation keys 204 is pressed, the cellular phone switches the information displayed on the display screen 202 in the order from the display of the function name to the display of the phone number data, the display of the mail address data, the display of the Internet address data, the display of music file data, image file data and video file data and the display of application file data. When the "→" key is further pressed in the state that the application file data only is displayed, the display returns to the collective display of the function name and user data. In addition, every time when the "←" key is pressed, the cellular phone switches the information displayed on the display screen 202 in the reversed order of the above.

Since the retrieval range of the user data is set to fall within the phone number data, the Internet address data, the music file data and the application file data in the retrieval range setting section 118 in this embodiment, the information to be displayed can be switched among the above. Here, the user can select any one out of the displayed function names and the user data on the display screen 202. FIG. 3 shows a state where a cursor is positioned on the registration name "car race" of the application file data. By operating the "↑" and "↓" keys of the operation keys 204 to move the cursor vertically and the enter key, the user can select a desired function name or user data.

When the user selects a function name (step S7), the cellular phone executes the function corresponding to the function name (step S8). Also, when the user selects the user data (step S7), the function which uses the user data is executed (step S8).

For example, when the selected user data is the phone number data, the cellular phone makes a phone call to the number. When the selected user data is the Internet address data, the cellular phone opens the URL of the address using Internet browser. When the selected user data is the mail address data, the cellular phone enters into a mail-creating mode using the address as the destination. When the selected user data is the music file name data, the image file name data or the video file name data, the cellular phone reproduces a music, image or video. Also when the selected user data is the application file name data, the cellular phone starts the application corresponding to the name data.

In this way, in the cellular phone according to the embodiment, when a retrieving word is inputted through the operating section 106 by the user, the retrieval section 108 retrieves the function name and the user data corresponding to the retrieving word from the function name storage section 102 and the user data storage section 104. And the retrieved function name and the user data are displayed on the display screen 202 collectively by the collective display control section 110. Owing to this, the user can obtain and grasp the information of both of the function name and the user data corresponding to the retrieving word collectively by single retrieval operation with respect to the retrieving word.

Accordingly, even when the user is not exactly aware of the information to be retrieved, or is not familiar with the operation of the cellular phone 100, the user can grasp the information stored in the cellular phone 100 and with respect to the retrieving word by single retrieval operation. Accordingly, in the cellular phone of this embodiment, the user-friendliness is largely increased.

Also, in the cellular phone of this embodiment, when the user retrieves the function name to connect to the external using the user data associated with the function, the user do not have to retrieve the user data again. Also in this point, the user-friendliness is increased.

Moreover, the cellular phone 100 according to the embodiment switches from the collective display of the function name and user data to the display of the function name only or the display of the user data only in accordance with the instruction by the user. Also, since the cellular phone carries out the display of function name and the display of user data using different icons in the case of a collective display, the user can recognize which the information displayed collectively belongs to between the function name and the user data. Additionally, in this embodiment, since a function to switch the display on the basis of the sort of the user data such as the mail address data and the Internet address data is also added, the user-friendliness of the cellular phone is increased.

Furthermore, according to the cellular phone 100 of the embodiment, the retrieval range setting section 118 is capable of setting the range of the function name or the user data to be retrieved. Accordingly, the user can retrieve excluding the user data of a sort to be excluded from the retrieval object. Owing to this, the user can carry out the retrieving more appropriately and effectively.

Further, the cellular phone 100 of the embodiment is adapted so as to store plural function names with respect to at least one function. Accordingly, the user can easily retrieve and start a desired function.

Note that in the above-described embodiment, the example has been given which includes the phone number data, the Internet address data, the mail address data, the music file name data, the image file name data, the video file name data, and the application file name data, as the user data. However, the information terminal of the present invention may not include all of the above data, or may include another kind of data.

Further, in the embodiment described above, the retrieval range is set and the display is switched with respect to the user data. However, the present invention may be adapted so that the retrieval range can be set and the display can be switched also with respect to the function name. In this case, in the information terminal according to the present invention, the function names are also sorted into plural attributes, and the retrieval range is set and the display is switched on the basis of the respective attributes in the same way as the user data.

Moreover, in the above-described embodiment, the retrieval section retrieves the function name and the user data within a range set by the retrieval range setting section 118. However, the present invention may be modified so that, for example, the user selects the retrieval range during the retrieval processing. For example, the information terminal of the present invention may be modified in such a way that, after the user inputs a retrieving word, the information terminal asks the user to input on which sort of the function name and the user data should be included in the retrieval range, and with respect to the sort inputted to be included in the retrieval range, the retrieval result is displayed collectively. Further, the information terminal of the present invention may be adapted so that, after the user has checked the retrieval result, the information terminal of the present invention can retrieve again using the same retrieving word in accordance with the instruction to change the retrieval range by the user.

Furthermore, in the above-described embodiment, the function name and the user data are displayed in the order of the Japanese syllabary. However, the information terminal of the present invention may be adapted so that the function name and the user data are displayed on the basis of appropriate sort. Further, in the above-described embodiment, as for the function name and the user data to be displayed collectively, the icons are displayed on the basis of the sort. However, the information terminal of the present invention may be adapted to display the icons using different colors on the basis of the sort. And in addition, it is needless to say that specific detailed structure etc may be changed appropriately.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the spirit and scope of the following claims. Further, the inventor's intent is to retain all equivalents even if the claims are amended during prosecution.

What is claimed is:

1. An information terminal having a plurality of functions, comprising:
    a function name storage section which stores at least one function name with respect to each of the plurality of functions;
    a user data storage section which stores user data;
    an operating section which receives an input of a retrieving word;
    a retrieval section which retrieves a function name and user data corresponding to a retrieving word supplied from the operating section from the function name storage section and the user data storage section; and
    a display control unit including a collective display control section which displays the function name and the user data outputted from the retrieval section collectively on a display screen.

2. The terminal according to claim 1, wherein the collective display section includes:
    a function name display control section which displays the function name out of the function name and the user data retrieved by the retrieval section on the display screen;
    a user data display control section which displays the user data out of the function name and the user data retrieved by the retrieval section on the display screen; and
    a display switching section which selectively switches the state of display on the display screen among the display through the collective display control section, the display through the function name display control section and the display through the user data display control section in accordance with the input from the operating section.

3. The terminal according to claim 1, further comprising a retrieval range setting section for setting a retrieval range of the function name or the user data to be retrieved by the retrieval section to the retrieval section in accordance with the input from the operating section.

4. The terminal according to claim 1, wherein the function name storage section stores a plurality of function names with respect to each of the plurality of functions.

5. The terminal according to claim 1, wherein the collective display control section displays the function name and the user data on the display screen by use of icons different from each other.

6. The terminal according to claim 1, wherein the collective display control section displays the function name and the user data using colors different from each other.

7. The terminal according to claim 1, wherein the user data includes data with respect to a telephone directory.

8. The terminal according to claim 1, wherein the user data includes data with respect to at least any one of Internet address and mail address.

9. The terminal according to claim 1, wherein the user data includes data with respect to at least any one of music file name, image file name, video file name and application file name.

10. A recording medium for recording a program of a computer to operate as an information terminal having a plurality of functions, the program comprising the steps of:
    storing at least one function name with respect to each of the plurality of functions in a function name storage section and storing user data in a user data storage section;
    obtaining a retrieving word from an operating section;

retrieving function names and user data corresponding to a retrieving word supplied from the operating section from the function name storage section and the user data storage section; and displaying the function name and the user data obtained in the retrieving step collectively on the display screen.

11. The recording medium according to claim 10, wherein the displaying step includes:

a function name displaying step for displaying the function name out of the retrieved function name and the user data on the display screen;

a user data displaying step for displaying the user data out of the retrieved function name and the user data on the display screen; and a display switching step for selectively switching the state of display on the display screen among the collective display of the function name and the display of the user data in accordance with an input from the operating section.

12. The recording medium according to claim 10, wherein the program further includes a retrieval range setting step for setting a retrieval range of the function name or the user data retrieved in the retrieving step to the retrieving step in accordance with the input from the operating section.

* * * * *